United States Patent
Gattass et al.

(10) Patent No.: US 11,329,446 B2
(45) Date of Patent: May 10, 2022

(54) OPTICAL FIBER SUPERLUMINESCENT LIGHT SOURCE

(71) Applicant: The Government of the United States of America, as represented by the Secretary of the Navy, Arlington, VA (US)

(72) Inventors: Rafael R. Gattass, Washington, DC (US); Colin C. Baker, Alexandria, VA (US); Augustus Xavier Carlson, Churchville, MD (US); L. Brandon Shaw, Woodbridge, VA (US); Jasbinder S. Sanghera, Ashburn, VA (US)

(73) Assignee: The Government of the United States of America, as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 16/996,975

(22) Filed: Aug. 19, 2020

(65) Prior Publication Data
US 2021/0376551 A1 Dec. 2, 2021

Related U.S. Application Data

(60) Provisional application No. 62/889,591, filed on Aug. 21, 2019.

(51) Int. Cl.
*H01S 3/067* (2006.01)
*H01S 3/0941* (2006.01)
(Continued)

(52) U.S. Cl.
CPC ...... *H01S 3/06795* (2013.01); *H01S 3/06712* (2013.01); *H01S 3/06716* (2013.01);
(Continued)

(58) Field of Classification Search
CPC ............ H01S 3/06716; H01S 3/06795; H01S 3/094003; H01S 3/0941; H01S 3/1606; H01S 3/1611
See application file for complete search history.

(56) References Cited

U.S. PATENT DOCUMENTS 5,319,652 A * 6/1994 Moeller ............... G02B 6/2551
385/127

FOREIGN PATENT DOCUMENTS

WO WO94/26011 * 11/1994

OTHER PUBLICATIONS

International Search Report and Written Opinion for PCT/US2020/046880.
(Continued)

*Primary Examiner* — Michael Carter
(74) *Attorney, Agent, or Firm* — US Naval Research Laboratory; Suresh Koshy

(57) ABSTRACT

An apparatus includes an amplified spontaneous emission source, which in turn includes an optical fiber. The optical fiber includes a solid core and a first end. The solid core includes a silica matrix. The silica matrix includes a rare-earth element and a glass co-dopant. The rare-earth element includes dysprosium or neodymium. The glass co-dopant includes $Al_2O_3$. The apparatus further includes a laser pump diode coupled to the first end of the optical fiber. The laser pump diode and the optical fiber cooperate to generate a spontaneous spectral emission confined to the solid core. The spontaneous spectral emission includes a simultaneous plurality of spectral regions.

20 Claims, 8 Drawing Sheets

(51) Int. Cl.
*H01S 3/094* (2006.01)
*H01S 3/16* (2006.01)
(52) U.S. Cl.
CPC ...... *H01S 3/0941* (2013.01); *H01S 3/094003* (2013.01); *H01S 3/1606* (2013.01); *H01S 3/1611* (2013.01)

(56) References Cited

OTHER PUBLICATIONS

Christian Krankel, et al. Out of the blue: semiconductor laser pumped visible rare-earth doped lasers, Laser & Photonics Reviews, Apr. 26, 2016, pp. 548-568, vol. 10, No. 4, Wiley-VCH Verlag GmbH, Weinheim, Germany.

S. O'Connor, et al., Laser material properties of Dy:YAG, Laser Technology for Defense and Security VIII, Proc. of SPIE, 2012, pp. 83811H1-83811H10, vol. 8381, SPIE, Bellingham, Washington USA.

Colin C. Baker, et al., Rare earth co-doping for increased efficiency of resonantly pumped Er-fiber lasers, Optical Materials Express, Mar. 1, 2019, pp. 1041-1048, vol. 9, No. 3, Optical Society of America, Washington, DC, USA.

* cited by examiner

OPTICAL FIBER SUPERLUMINESCENT LIGHT SOURCE

This Application claims the benefit of U.S. Provisional Application Ser. No. 62/889,591 filed on 21 Aug. 2019, the entirety of which is incorporated herein by reference.

FEDERALLY-SPONSORED RESEARCH AND DEVELOPMENT

The United States Government has ownership rights in this invention. Licensing inquiries may be directed to Office of Technology Transfer, US Naval Research Laboratory, Code 1004, Washington, D.C. 20375, USA; +1.202.767.7230; techtran@nrl.navy.mil, referencing NC 108858-US2.

BACKGROUND OF THE INVENTION

Field of the Invention

This invention relates in general to an amplified spontaneous emission source, and in particular to an amplified spontaneous emission source using a rare-earth-doped optical fiber.

Description of the Related Art

Superluminescent sources are based on amplified spontaneous emission from an optically active gain medium. Materials capable of active gain can be rare-earth (or transition metal) doped transparent materials and electrically driven laser-diodes. However, the emission bandwidth of laser diodes are limited by the design and gain of the material, leading to single emission bandwidths for a given diode design. Alternatively, spontaneous emission occurring from the optical gain of rare-earth ion (or transition metal ion) doped materials can emit over multiple wavelengths depending on the excitation wavelength and the rare-earth ion (or transition metal ion) used.

The emission from dopant ions is dependent on the material host in which the ion is placed. For example, spontaneous emission is present for Ytterbium and Erbium ions doped in a silica matrix with optical emissions around 1 μm and 1.55 μm, respectively, but optical emission from other energy levels can be suppressed by coupling to the host phonon states. For example, the 2.7 μm emission from Er is not present in a silica matrix, but can be observed in a fluoride based glass composition due to its lower phonon energy.

The optical transmission window of a glass is determined by the material composition of the glass. The short wavelength side of the glass transmission is limited by electronic absorption of the glass host, while the long wavelength side is limited by multi-phonon absorption. Once the photon energy approaches about 4 times the phonon energy of the host, the light will be significantly absorbed.

Certain rare-earth ions can maintain energy levels spaced beyond the energy of a phonon even when placed inside a glass material matrix. However, the emission of light from an electron excited to the upper level on such ion can decay down without emission if the spacing is not significantly larger than the phonon energy, typically between 3 to 4 times the phonon energy. Therefore, the choice of glass host has a great impact on the emission efficiency for different ions.

Superluminescent sources are distinct from most lasers, because they can simultaneously emit multiple wavelengths in a continuous fashion (not pulsing). One method by which this is accomplished is through the lack of optical feedback to the optical medium. The lack of optical feedback allows for a wide range of wavelengths to be emitted simultaneously with no preferential wavelength dominating and extracting the optical gain. In any system developed to incorporate the active optical medium, the ability to suppress back reflections from the active medium is a crucial step in maintaining broad emission.

A silica based optical fiber is typically composed of a core and clad region, with each region being characterized by a refractive index. Typically, the refractive index of the core region is greater than the index of the cladding region. Other fiber architectures are known to those knowledgeable in the art such as multiple cladding optical fibers (double clad fibers are one such example), photonic crystal fibers, and depressed cladding fibers.

Typical fiber core dimensions are 1 to 50 μm, with cladding dimensions on the order of 1 to 1000 μm.

Typical silica glass composition contains at least 80 mole % of $SiO_2$ and can include the addition of $P_2O_5$, $Al_2O_3$ and $GeO_2$ to include waveguide control and other functions. These additives are present in significantly lower concentrations typically on the order of 0 to 20 mole %.

Optical fiber fabrication is based on the fiber drawing of a preform with a given material composition. A common method for making a silica-glass based fiber preform is solution doping. This method involves the use of a solution to deliver ions (dopants) to a silica matrix. Unfortunately there is no direct control of the rare-earth ions molecular environment which may lead to detrimental optical effects in the fiber.

Solution Doping

More specifically, in silica fibers prepared by solution doping, salts of rare-earth ions such as neodymium ions ($Nd^{3+}$) or Dysprosium ions ($Dy^{3+}$) are dissolved in methanol together with aluminum (Al) chlorides. The solution is filtered and doped into the porous silica soot preform cores. The use of an aluminum precursor is an excellent method to reduce rare-earth ion clustering (such as $Nd^{3+}$ ion clustering and $Dy^{3+}$ ion clustering) and to help dissolve the rare-earth ion into the silica lattice, where the Al acts as a solvation shell. The Al concentration in the silica fiber may also be used to obtain refractive index control, as aluminum oxide has a relatively high refractive index. This however imposes limits to the concentration of Al that can be used in the fiber and maintain proper numerical aperture ("NA") for single mode guidance, if that is needed.

BRIEF SUMMARY OF THE INVENTION

An embodiment of the invention includes an apparatus is for use, alone or in part, in a superluminescent laser system. The apparatus includes an amplified spontaneous emission source, which in turn includes an optical fiber. The optical fiber includes a solid core and a first end. The solid core includes a silica matrix. The silica matrix includes a rare-earth element and a glass co-dopant. The rare-earth element includes dysprosium. The glass co-dopant includes $Al_2O_3$. The apparatus further includes a laser pump diode coupled to the first end of the optical fiber. The laser pump diode and the optical fiber cooperate to generate a spontaneous spectral emission confined to the solid core. The spontaneous spectral emission includes a simultaneous plurality of spectral regions. The simultaneous plurality of spectral regions includes at least two of an about 470 to 505 nm spectral region, an about 545 to 625 nm spectral region, an about 635 nm to 700 nm spectral region, an about 730 to 785 nm spectral region, an about 815 to 865 nm spectral region, and an about 880 to 895 nm spectral region.

An embodiment of the invention includes an apparatus is for use, alone or in part, in a superluminescent laser system. The apparatus is for use, alone or in part, in a superluminescent laser system. The apparatus includes an amplified spontaneous emission source, which in turn includes an optical fiber. The optical fiber includes a solid core and a first end. The solid core includes a silica matrix. The silica matrix includes a rare-earth element and a glass co-dopant. The rare-earth element includes neodymium. The glass co-dopant includes $Al_2O_3$. The apparatus further includes a laser pump diode coupled to the first end of the optical fiber. The laser pump diode and the optical fiber cooperate to generate a spontaneous spectral emission confined to the solid core. The spontaneous spectral emission includes a simultaneous plurality of spectral regions. The simultaneous plurality of spectral regions includes at least two of an about 765 nm to 840 nm spectral region, an about 840 nm to 1000 nm spectral region and an about 1000 to 1160 nm spectral region.

This invention describes a system and method for achieving superluminescent light in the visible or near-infrared from a fiber based light source. More specifically, we disclose a system and method for achieving milliwatts (typically less than 50 mW) average power sources with spectral emission spanning from 845 nm to 957 nm and simultaneously over 1030 to 1120 nm and emission confined to the core of an optical fiber based on a Nd-doped optical fiber. Another embodiment of the system, based on a Dy-doped optical fiber, provides multiple emissions in the visible band, spanning the following spectral regions: 470 to 505 nm, 545 to 625 nm, 635 nm to 700 nm, 730 to 785 nm, 815 to 865 nm and 880 to 895 nm. In both optical systems the emitted light is not coherent. Applications of such sources include excitation of fluorophores in biological imaging, material characterization, light displays, illumination, and many others.

In an embodiment of the invention, the superluminescent source allows for multiple wavelength emissions.

In an embodiment of the invention, the use of silica fiber allows for splicing to other silica fibers such as those common to laser pump diodes without introducing new interfaces and feedback.

In an embodiment of the invention, the wavelengths generated are not available with conventional superluminescent diodes.

In an embodiment of the invention, the system can be all spliced increasing system reliability, mechanical and environmental stability.

In an embodiment of the invention, the architecture of the system allows for polarization maintaining and polarization independent emissions In an embodiment of the invention, the emission is guided by an optical fiber that can be single transverse optical mode, increasing brightness.

In an embodiment of the invention, the output power can be scaled to higher powers.

DETAILED DESCRIPTION OF THE INVENTION

Figure 1:
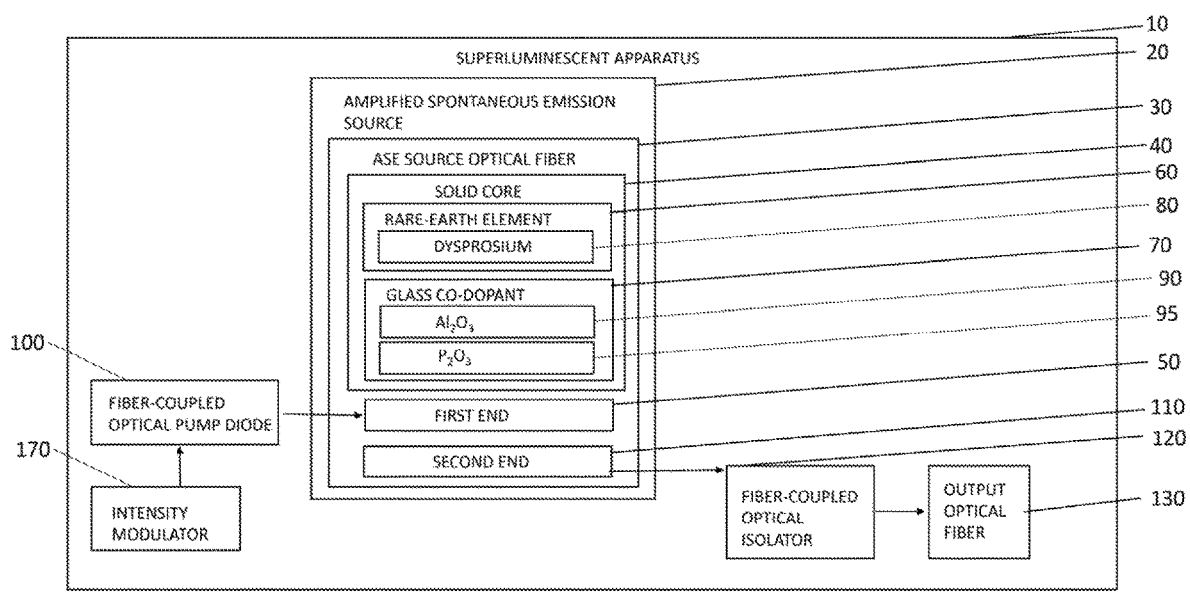
FIG. 1 is a block diagram of a superluminescent laser system for Dy-doped silica fiber according to an embodiment of the invention, this embodiment including a fiber-coupled isolator.
Figure 2:
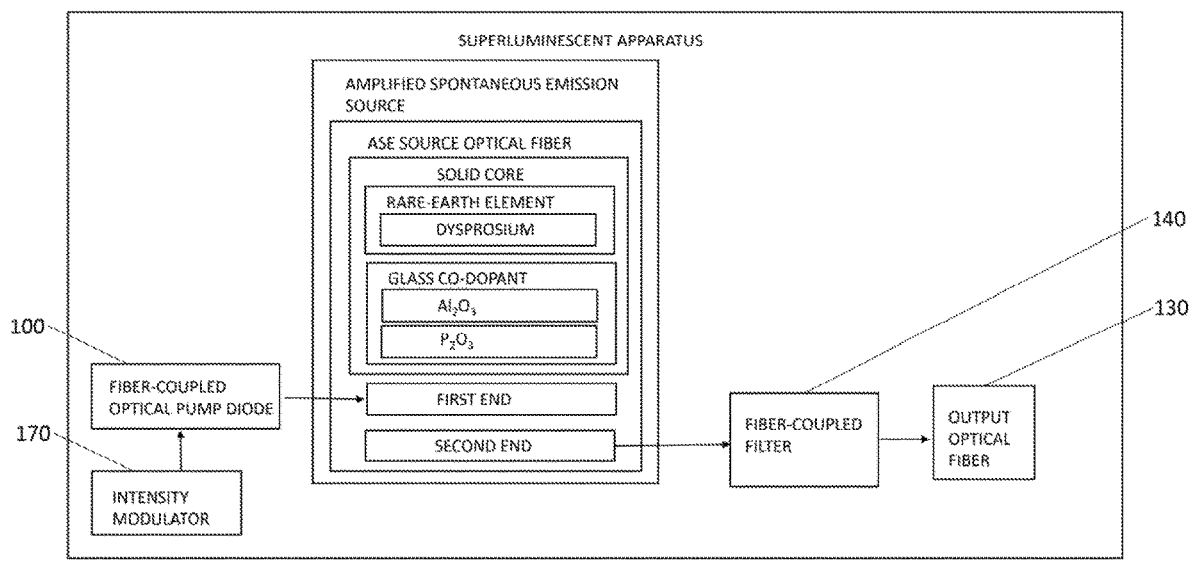
FIG. 2 is a block diagram of a superluminescent laser system for Dy-doped silica fiber according to an embodiment of the invention, this embodiment including a fiber-coupled filter.

An embodiment of the invention includes a superluminescent apparatus 10 and is described as follows, for example, with reference to FIGS. 1-4. The apparatus 10 is for use in a superluminescent laser system. The apparatus 10 includes an amplified spontaneous emission ("ASE") source 20, which in turn includes an ASE optical fiber 30. The ASE optical fiber includes a solid core 40 and a first end 50. The solid core 40 includes a silica matrix. The silica matrix includes a rare-earth element 60 and a glass co-dopant 70. The rare-earth element includes standard dysprosium ("Dy") 80. The glass co-dopant includes standard $Al_2O_3$ 90. The apparatus 10 further includes a standard, fiber-coupled optical pump diode 100 coupled to the first end 50 of the ASE optical fiber 30. In a preferred embodiment, the standard, fiber-coupled optical pump diode 100 is directly coupled to the first end 50 of the ASE optical fiber 30 such that there is no interface between the ASE optical fiber 30 and the optical pump diode 100. In such a preferred embodiment, the combination of the ASE optical fiber having a silica matrix and the direct coupling of the ASE optical fiber and the optical pump diode 100 provides ease of splicing, provides a mechanically stable connection, and/or allows for a lower assembly cost than mechanically aligning the optical pump diode to the ASE optical fiber via an interface. The optical pump diode 100, for example, includes a standard laser pump diode. The optical pump diode 100 and the ASE optical fiber 30 cooperate to generate a spontaneous spectral emission confined to the solid core 40. For the purpose of this patent application, "spontaneous spectral emission," and, equivalently, "superluminescence," are terms of art and are defined as light, produced by spontaneous emission, that has been optically amplified by the process of stimulated emission in a gain medium. This light displays high spatial coherence, but low temporal coherence. The spontaneous spectral emission includes a simultaneous plurality of spectral regions. As shown by way of representation in FIG. 4, the simultaneous plurality of spectral regions includes at least two of an about 470 to 505 nm spectral region, an about 545 to 625 nm spectral region, an about 635 nm to 700 nm spectral region, an about 730 to 785 nm spectral region, an about 815 to 865 nm spectral region, and an about 880 to 895 nm spectral region. For the purpose of this patent application, the spectral regions for the Dy-doped silica fiber apparatus are defined to have an emission power per nm that is 10 dB above the noise of the detector, meaning the power of ASE, i.e., the power at the detector with no signal is 10 dB. By this definition, at the detector, this power would be 10× the noise equivalent power, the spontaneous emission power being about 10 pW per nm. One of ordinary skill in the art will readily recognize that defining the offset from the noise to the signal higher or lower will result in different spectral regions. For example, if the offset from the noise to the signal is 25 dB, then the spectral regions would be about 473 nm to 494 nm, and about 555 nm to 603 nm, respectively, the spectral regions implying a power of about 3 nW per nm.

Optionally, the rare-earth element 50 includes a dysprosium concentration and the glass co-dopant includes an $Al_2O_3$ concentration. A ratio of $Al_2O_3$ concentration to dysprosium concentration is between 5:1 and 100:1. Optionally, the glass co-dopant 70 further includes $P_2O_5$ 95. The glass co-dopant 70 includes a $P_2O_5$ concentration. A ratio of $Al_2O_3$ concentration to $P_2O_5$ concentration is between 0 and 0.8.

Optionally, the optical pump diode 100 includes a center emission between 400 nm and 500 nm in wavelength and includes a power between 5 mW and 500 mW. Optionally, the ASE optical fiber 30 includes a second end 110. The apparatus further includes a standard fiber-coupled optical isolator 120 connected to the second end of the ASE optical fiber 30, as shown by way of example in FIG. 1. For example, the isolator 120 is connected to a standard output optical fiber 130. Alternatively, as shown by way of example in FIG. 2, the ASE optical fiber 30 includes a second end 110. The apparatus 10 further includes a standard fiber-coupled filter 140 connected to the second end 110 of the ASE optical fiber 30 and passing a respective spectral region from the simultaneous plurality of spectral regions. Still further alternatively, as shown by way of example in FIG. 3, the optical fiber includes a second end 110. The apparatus further includes a plurality of standard fiber-coupled filters 150 connected to the second end 110 of the ASE optical fiber and passing a plurality of respective spectral regions from the simultaneous plurality of spectral regions. The apparatus 10 further includes a standard fiber switch 160 located between the ASE optical fiber 30 and the plurality of fiber-coupled filters 150. The fiber switch 160 and the plurality of fiber-coupled filters 150 cooperate to select for output from among the plurality of respective spectral regions.

Optionally, the apparatus further includes a standard intensity modulator 170 communicating with the laser pump diode thereby temporally modulating the optical pump diode 100.

Optionally, the ASE optical fiber 30 includes a standard polarization-maintaining optical fiber.

Optionally, the optical fiber is prepared by a process. The process includes fabricating the silica matrix by standard solution doping, using dysprosium ions ($Dy^{3+}$). The dysprosium ions include a dysprosium ion concentration between about $0.5 \times 10^{25}$ $m^{-3}$ and $10 \times 10^{25}$ $m^{-3}$. In "solution doping" to create a rare-earth-doped-core silica fiber 30, a salt of rare earth ions (in this case, Dy3+) is dispersed in methanol along with a salt of aluminum, (such as aluminum chloride which will form $Al_2O_3$, when the fiber has been completed). This multicomponent solution is infused into the core of the fiber to make a rare-earth-doped-core fiber 30.

An embodiment of the invention includes a superluminescent apparatus 10 and is described as follows with reference to FIGS. 5-8. The apparatus 10 is for use in a superluminescent laser system. The apparatus 10 includes an amplified spontaneous emission source 20, which in turn includes an ASE optical fiber 30. The ASE optical fiber 30 includes a solid core 40 and a first end 50. The solid core 40 includes a silica matrix. The silica matrix includes a rare-earth element 60 and a glass co-dopant 70. The rare-earth element 60 includes neodymium ("Nd") 85. The glass co-dopant 70 includes $Al_2O_3$ 90. The apparatus 10 further includes a standard, fiber-coupled, optical pump diode 100 coupled to the first end 50 of the ASE optical fiber 30. The optical pump diode 100 and the ASE optical fiber 30 cooperate to generate a spontaneous spectral emission confined to the solid core. For the purpose of this patent application, "spontaneous spectral emission," and "superluminescence," are terms of art and are defined as light, produced by spontaneous emission, that has been optically amplified by the process of stimulated emission in a gain medium. This light displays high spatial coherence, but low temporal coherence. The spontaneous spectral emission includes a simultaneous plurality of spectral regions. As shown by way of representation in FIG. 8, the simultaneous plurality of spectral regions includes at least two of an about 765 nm to 840 nm spectral region, an about 840 nm to 1000 nm spectral region and an about 1000 to 1160 nm spectral region. For the purpose of this patent application, the spectral regions for the Nd-doped silica fiber apparatus are defined to have an emission power per nm that is 10 dB above the noise of the detector, meaning the power of ASE, i.e., the power at the detector with no signal is 10 dB. By this definition, at the detector, this power would be 10× the noise equivalent power, the spontaneous emission power being about 10 pW per nm. One of ordinary skill in the art will readily recognize that defining the offset from the noise to the signal higher or lower will result in different spectral regions. For example, if the offset from the noise to the signal is 25 dB, then the spectral regions would be about 810-820 nm, about 857-975 nm, and about 1015-1135 nm, respectively, the spectral regions implying a power of about 3 nW per nm.

Optionally, the rare-earth element 60 includes a neodymium concentration, and the glass co-dopant 90 includes an $Al_2O_3$ concentration. A ratio of $Al_2O_3$ concentration to neodymium concentration is between 20:1 and 100:1. The glass co-dopant 90 further includes $P_2O_5$. The glass co-dopant 90 includes a $P_2O_5$ concentration. A ratio of $Al_2O_3$ concentration to $P_2O_5$ concentration is between 0 and 0.8.

Optionally, the optical pump diode 100 includes a center emission between 400 nm and 500 nm in wavelength and includes a power between 5 mW and 500 mW. Optionally, the ASE optical fiber 30 includes a second end 110. The apparatus 10 further includes a standard, fiber-coupled optical isolator 120 connected to the second end 110 of the ASE optical fiber 30, as shown by way of example in FIG. 5. Alternatively, as shown by way of example in FIG. 6 the ASE optical fiber 30 includes a second end 110. The apparatus 10 further includes a standard fiber-coupled filter 140 connected to the second end 110 of the ASE optical fiber 30 and passing a respective spectral region from the simultaneous plurality of spectral regions. Alternatively still, as shown by way of example in FIG. 7 the ASE optical fiber 30 includes a second end 110. The apparatus 10 further includes a plurality of fiber-coupled filters 150 connected to the second end 110 of the ASE optical fiber 30 and passing a plurality of respective spectral regions from the simultaneous plurality of spectral regions. The apparatus 10 further includes a standard fiber switch 160 located between the ASE optical fiber 30 and the plurality of fiber-coupled filters 150. The fiber switch 160 and the plurality of fiber-coupled filters 150 cooperate to select for output from among the plurality of respective spectral regions.

Optionally, the apparatus further includes a standard intensity modulator 170 communicating with the optical pump diode 100 thereby temporally modulating the laser pump diode.

Optionally, the ASE optical fiber 30 includes a polarization-maintaining optical fiber.

Optionally, the ASE optical fiber 30 is prepared by a process including fabricating the silica matrix by solution doping using neodymium ions ($Nd^{3+}$), the neodymium ions including a neodymium ion concentration between $0.1 \times 10^{25}$ $m^{-3}$ and $10 \times 10^{25}$ $m^{-3}$. In "solution doping" to create a rare-earth-doped-core silica fiber 30, a salt of rare earth ions (in this case, Nd3+) is dispersed in methanol along with a salt of aluminum, (such as aluminum chloride which will form $Al_2O_3$, when the fiber has been completed). This multicomponent solution is infused into the core of the fiber to make a rare-earth-doped-core fiber 30.

Another embodiment of the invention is described as follows, with reference by way of illustration to FIGS. 1-4. A silica-based optical fiber 30 is fabricated having a solid core region 40 doped with Dy ions. The Dy ions are incorporated into the silica matrix of the solid core region 40 through a standard solution-based method. The ion concentration has to remain between about $0.5 \times 10^{25}$ $m^{-3}$ and $10 \times 10^{25}$ $m^{-3}$ as increasing the concentration of Dy ions leads to clustering of the Dy ions and quenching of the energy levels. To reduce the clustering of Dy ions, the Dy ions are incorporated in the silica matrix in a high concentration of $Al_2O_3$, typically on the order of 5:1 to 100:1 times the concentration of Dy. The $Al_2O_3$ greatly increases the solubility of the rare earth in the silica matrix. The addition of Dy ions without the presence of either $Al_2O_3$ or $P_2O_5$ leads to clustering and no significant emission. However, the addition of Al or P to the silica composition has a direct impact on the refractive index, and can present a significant challenge to maintaining a given refractive index contrast between the core and the cladding.

The fabricated fiber 30 has a solid core 40 with a larger refractive index than the cladding, leading to light guidance within the core. Preferably, the refractive index of the fiber 30 is such that single mode operation at the relevant emission bands of 470 to 505 nm, 545 nm to 625 nm, 635 nm to 700 nm, 730 to 785 nm, 815 to 865 nm and 880 to 895 nm occurs. The system is composed of a fiber coupled optical diode with emission centered between 400 and 500 nm, preferably between 440 nm and 460 nm, with light emission carried by the core of the fiber. The fiber coupled optical diode is optically spliced to one side of the Dy doped fiber, and the Dy doped fiber is angle cleaved on the other side to reduce back reflections. Typical angles for the angle cleave are between 4 and 45 degrees, more preferably between 6 and 15 degrees. Alternatively, the fiber can be spliced to a fiber coupled optical isolator.

The power of the fiber-coupled optical pump diode 100 is between 10 mW and 100 W, more typically between 10 mW and 500 mW. The fiber 30 is typically single mode at the pump wavelength but can also be multimode.

The Dy doped optical fiber can be polarization maintaining.

The use of a silica glass fiber matrix as a base for the Dy dopant ensures that a strong mechanical bond can be accomplished with the fiber coupled pump diode. It also allows for a critical feature required for a spontaneous emission source, specifically a negligible refractive index mismatch between both the pump optical fiber and the doped silica fiber. The refractive index difference can remain below 0.04 between the fibers, insuring that no significant feedback will occur at the splice interface and therefore no particular emission wavelength will be selected. This allows for both the increase of the emission bandwidth but also the optical power of the amplified spontaneous emission source.

Another embodiment of the invention is described as follows, with reference by way of illustration to FIGS. 5-8. In this embodiment of the invention, the silica glass matrix is doped with Nd ions for the formation of a superluminescence source emitting between 845 nm to 957 nm and simultaneously over 1030 to 1120 nm. In the case of Nd, the ion concentration must remain between $0.1 \times 10^{25}$ $m^{-3}$ and $10 \times 10^{25}$ $m^{-3}$ to ensure sufficient absorption of the pump light while avoiding concentration induced quenching. To reduce the clustering of Nd ions, the Nd ions are incorporated in the silica matrix along with a high concentration of $Al_2O_3$, typically on the order of 20:1 to 100:1 times the concentration of Nd. The optical pump wavelength for the Nd case is typically between 780 nm and 840 nm, more typically between 800 and 815 nm.

The use of silica fiber as a host for the rare earth ions of interest instead of other glass materials such as germanate based glasses or fluoride based glasses allows for direct fusion splicing with silica based fibers and with no significant interface, leading to no feedback from the splice.

EXAMPLE 1

Figure 4:
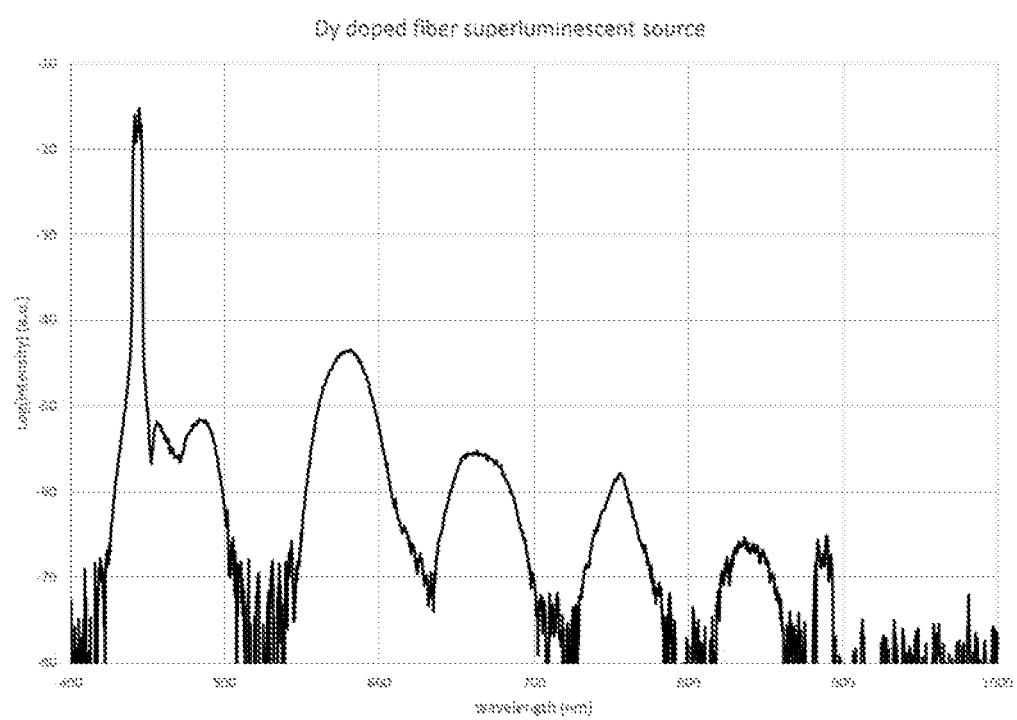
FIG. 4 is an illustrative graph of superluminescence emission from a laser-diode-pumped Dy solution doped silica fiber according to an embodiment of the invention, the superluminescence emission including output from a laser diode pump as well as superluminescence generated in fiber and guided out of a laser system incorporating such fiber.
Figure 5:
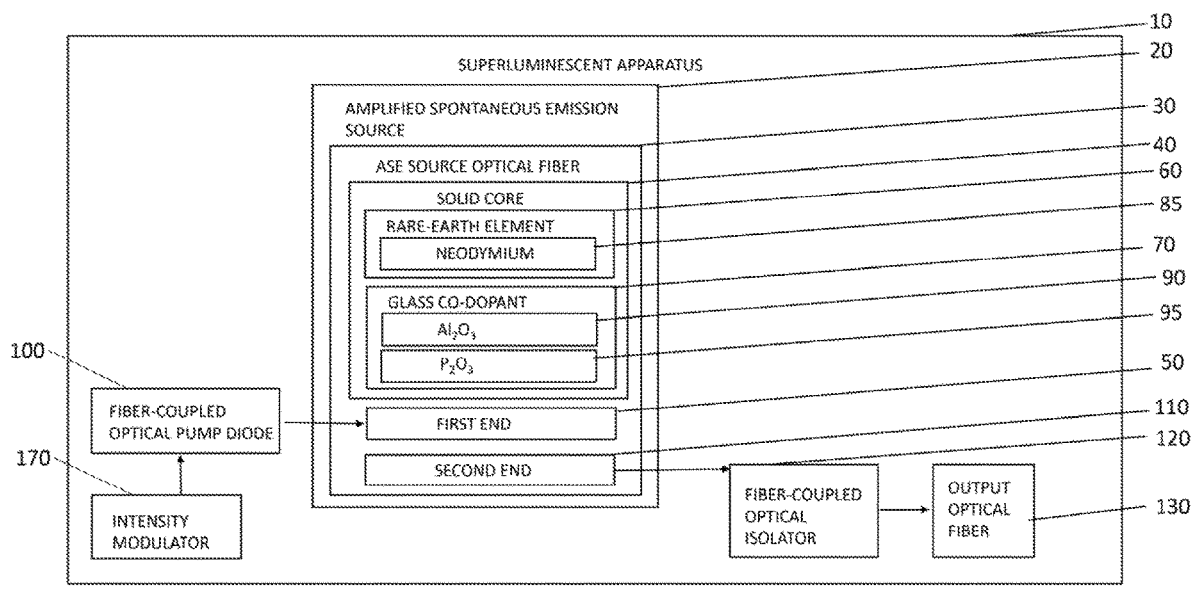
FIG. 5 is a block diagram of a superluminescent laser system for Nd-doped silica fiber according to an embodiment of the invention, this embodiment including a fiber-coupled isolator.
Figure 6:
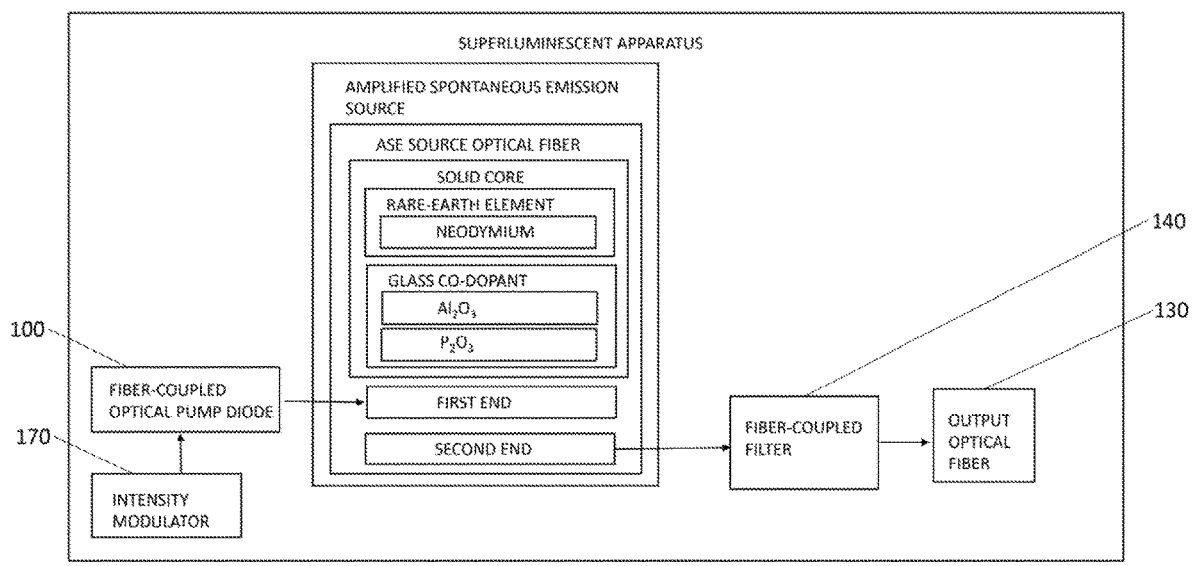
FIG. 6 is a block diagram of a superluminescent laser system for Nd-doped silica fiber according to an embodiment of the invention, this embodiment including a fiber-coupled filter.

An embodiment of the invention includes a superluminescent source based on Dy-doped silica fiber and includes emission covering multiple simultaneous bands as shown in by way of representation in FIG. 4. The apparatus 10 is composed of a fiber coupled laser diode 100 with center emission at 450 nm wavelength, which is coupled to a 100 μm diameter core fiber with 125 μm diameter cladding. The laser diode fiber is, for example, fusion spliced to a double clad Dy solution doped fiber with core diameter 25 μm and cladding of 125 μm diameter. The numerical aperture of the Dy-doped fiber is, for example, 0.22 for the core, determined by the aluminum concentration with a $1^{st}$ clad numerical aperture of 0.45. The preform is doped with a solution of 0.377 M Aluminum and 0.047 M Dysprosium for a Al:Dy ratio of 8:1. The total power emitted outside the laser diode band is less than 5 mW. The Dy-fiber is angle cleaved at ~8 degrees to reduce feedback from the end face and suppress lasing.

EXAMPLE 2

Another embodiment of the invention is similar that described in Example 1, except wherein a standard fiber-coupled optical isolator 120 is spliced to the output of the Dy fiber, and the pump can be temporally modulated up to 1 kHz frequency. This apparatus includes two additional features: ability to synchronize the emission with an external trigger, and optical isolation of the emission from external feedback allowing for direct splicing of the superluminescence source to another optical fiber.

EXAMPLE 3

Figure 8:
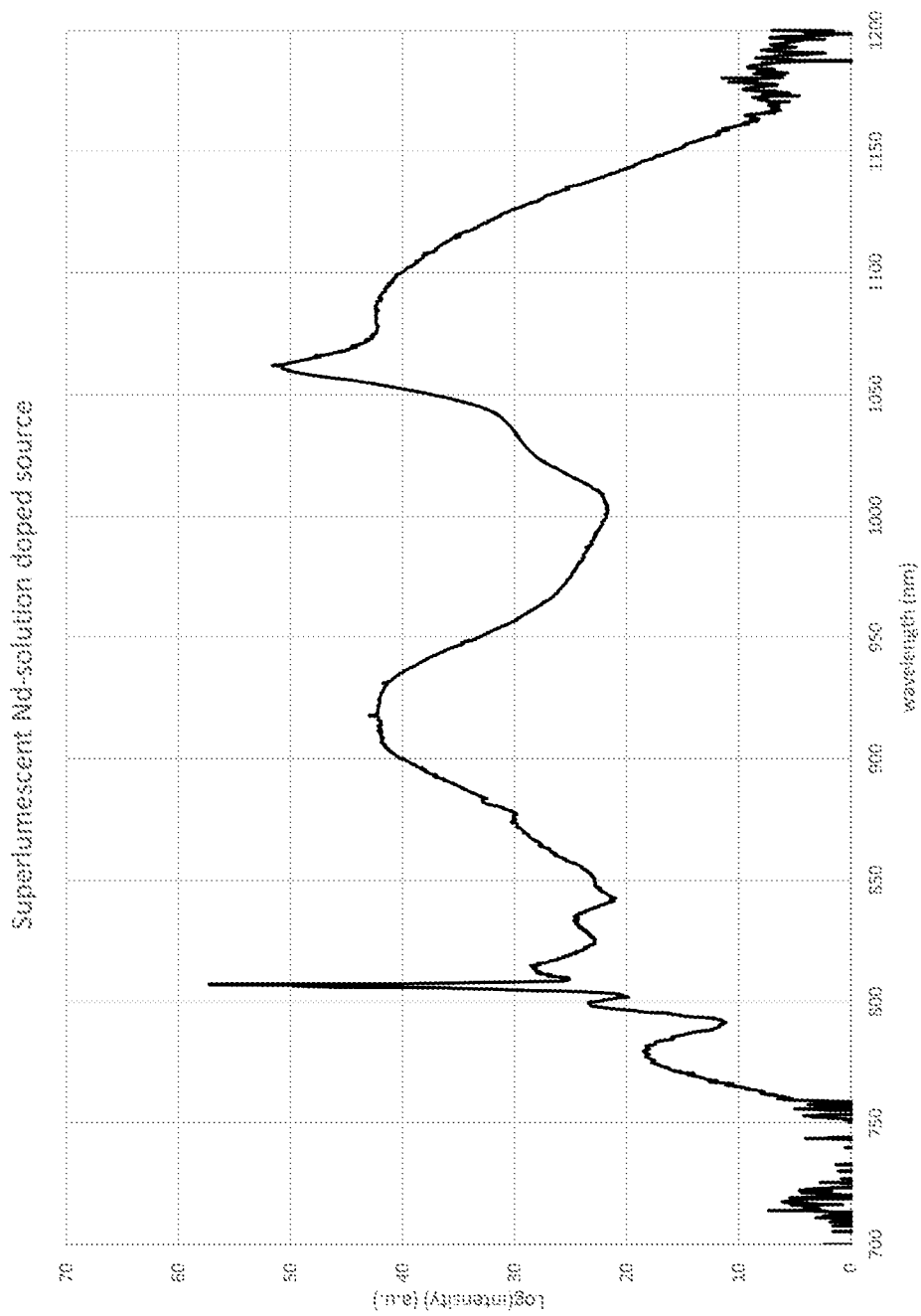
FIG. 8 is an illustrative graph of superluminescence emission from a laser-diode-pumped Nd solution doped silica fiber, the superluminescence emission including output from a laser diode pump as well as superluminescence generated in fiber and guided out of a laser system incorporating such fiber.

Another embodiment of the invention includes a superluminescent source based on Nd-doped silica fiber is demonstrated with emission covering multiple simultaneous bands as shown by way of representation in FIG. 8. The apparatus includes a single mode fiber-coupled laser diode with center emission at 808 nm wavelength, which is coupled to a 5 µm diameter core fiber with 125 µm diameter cladding. In this embodiment the laser diode fiber coupled to the Nd-doped fiber through the use of a standard wavelength division multiplexer fiber combiner. The fiber-coupled laser diode is, for example, fusion spliced to one port of the wavelength division multiplexer fiber combiner and a single clad Nd solution doped fiber with core diameter 8.8 µm and cladding of 125 µm diameter is spliced to the output port of the combiner. The second port of the combiner is, for example, angle-cleaved to reduce feedback. The numerical aperture of the Nd-doped fiber is, for example, 0.07 for the core. The preform is doped with a 0.061 g Nd chloride, and 2.93 g Al chloride in 200 ml methanol, for a Al:Nd ratio of 90:1. The total power emitted outside the laser diode band is less than 5 mW. The Nd-fiber is, for example, angle-cleaved at ~8 degrees to reduce feedback from the end face and suppress lasing.

The rare-earth doped fiber is, for example, made to propagate a single mode for one or multiple of the emission bands.

The apparatus is, for example, polarization-maintaining with the output linearly polarized along a single polarization axis.

Individual bands are, for example, filtered by a fiber-coupled filter 140 so that the emission is restricted to a narrower band.

Figure 3:
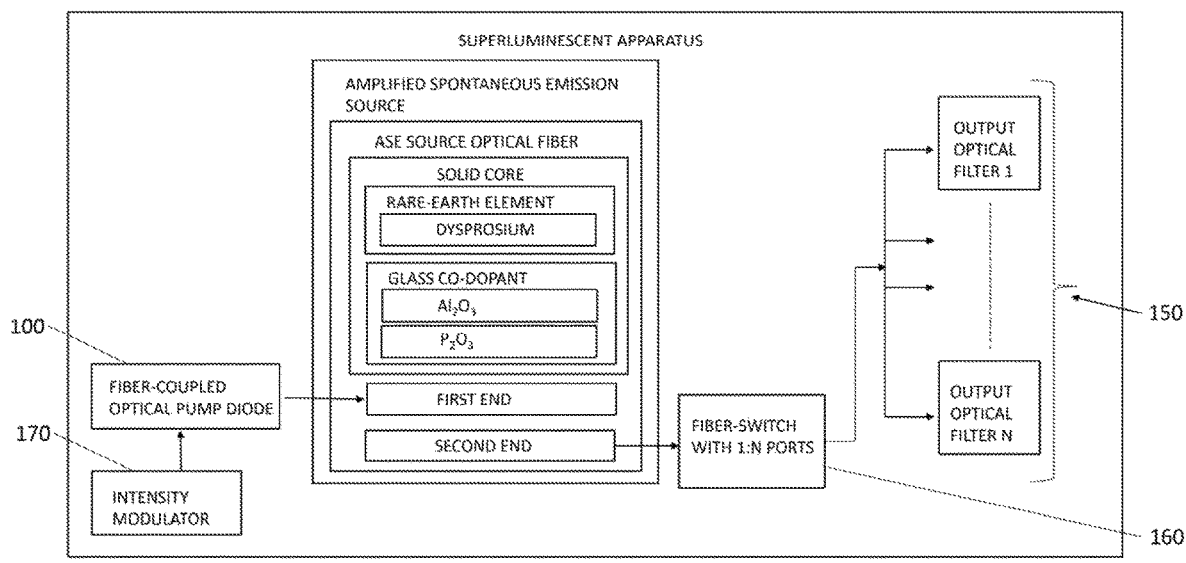
FIG. 3 is a block diagram of a superluminescent laser system for Dy-doped silica fiber according to an embodiment of the invention, this embodiment including a fiber switch and a plurality of fiber-coupled filters.
Figure 7:
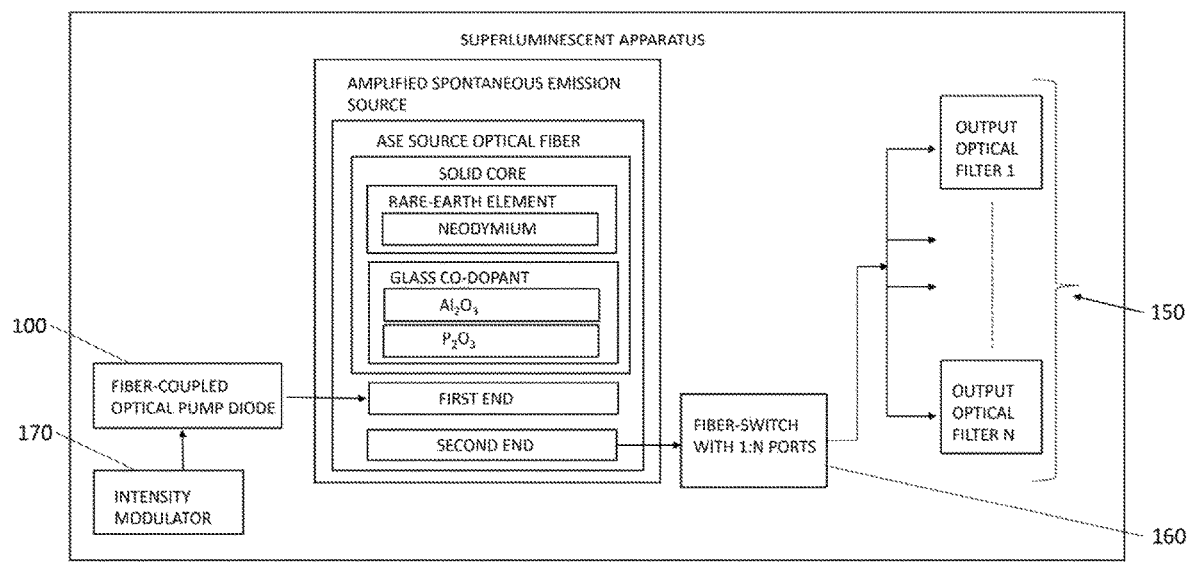
FIG. 7 is a block diagram of a superluminescent laser system for Nd-doped silica fiber according to an embodiment of the invention, this embodiment including a fiber switch and a plurality of fiber-coupled filters.

A standard fiber switch 160 is, for example, included between the emission and a sequence of filters to allow selection of different emission ranges, such as shown in FIGS. 3 and 7.

The apparatus is, for example, externally electronically modulated by direct modulation of the laser pump or through the addition of a standard intensity modulator 170.

Although a particular feature of the disclosure may have been illustrated and/or described with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising".

As used herein, the singular forms "a", "an," and "the" do not preclude plural referents, unless the content clearly dictates otherwise.

As used herein, the term "and/or" includes any and all combinations of one or more of the associated listed items.

As used herein, the term "about" when used in conjunction with a stated numerical value or range denotes somewhat more or somewhat less than the stated value or range, to within a range of ±10% of that stated.

All documents mentioned herein are hereby incorporated by reference for the purpose of disclosing and describing the particular materials and methodologies for which the document was cited.

Although the present invention has been described in connection with preferred embodiments thereof, it will be appreciated by those skilled in the art that additions, deletions, modifications, and substitutions not specifically described may be made without departing from the spirit and scope of the invention. Terminology used herein should not be construed as being "means-plus-function" language unless the term "means" is expressly used in association therewith.

This written description sets forth the best mode of the invention and provides examples to describe the invention and to enable a person of ordinary skill in the art to make and use the invention. This written description does not limit the invention to the precise terms set forth. Thus, while the invention has been described in detail with reference to the examples set forth above, those of ordinary skill in the art may effect alterations, modifications and variations to the examples without departing from the scope of the invention.

These and other implementations are within the scope of the following claims.

What is claimed as new and desired to be protected by Letters Patent of the United States is:

1. An apparatus comprising:
   an amplified spontaneous emission source comprising an optical fiber, said optical fiber comprising a solid core and a first end, said solid core comprising a silica matrix, said silica matrix comprising a rare-earth element and a glass co-dopant, said rare-earth element comprises dysprosium, said glass co-dopant comprises $Al_2O_3$; and
   a laser pump diode coupled to said first end of said optical fiber, said laser pump diode and said optical fiber cooperating to generate a spontaneous spectral emission confined to said solid core, the spontaneous spectral emission comprising a simultaneous plurality of spectral regions,
   wherein the simultaneous plurality of spectral regions comprises at least two of an about 470 to 505 nm spectral region, an about 545 to 625 nm spectral region, an about 635 nm to 700 nm spectral region, an about 730 to 785 nm spectral region, an about 815 to 865 nm spectral region, and an about 880 to 895 nm spectral region.

2. The apparatus according to claim 1, wherein said rare-earth element comprises a dysprosium concentration and said glass co-dopant comprises an $Al_2O_3$ concentration, wherein a ratio of $Al_2O_3$ concentration to dysprosium concentration is between 5:1 and 100:1.

3. The apparatus according to claim 2, wherein said glass co-dopant further comprises $P_2O_5$, said glass co-dopant comprising a $P_2O_5$ concentration, wherein a ratio of $Al_2O_3$ concentration to $P_2O_5$ concentration is between 0 and 0.8.

4. The apparatus according to claim 1, wherein said laser pump diode comprises a center emission between 400 nm and 500 nm in wavelength and comprises a power between 5 mW and 500 mW.

5. The apparatus according to claim 4, wherein said optical fiber comprises a second end, the apparatus further comprising:

a fiber-coupled optical isolator connected to said second end of said optical fiber.

6. The apparatus according to claim 4, wherein said optical fiber comprises a second end, the apparatus further comprising:
a fiber-coupled filter connected to said second end of said optical fiber and passing a respective spectral region from the simultaneous plurality of spectral regions.

7. The apparatus according to claim 4, wherein said optical fiber comprises a second end, the apparatus further comprising:
a plurality of fiber-coupled filters connected to said second end of said optical fiber and passing a plurality of respective spectral regions from the simultaneous plurality of spectral regions; and
a fiber switch located between said optical fiber and said plurality of fiber-coupled filter,
wherein said fiber switch and said plurality of fiber-coupled filters cooperate to select for output from among the plurality of respective spectral regions.

8. The apparatus according to claim 1, further comprising:
an intensity modulator communicating with said laser pump diode thereby temporally modulating said laser pump diode.

9. The apparatus according to claim 1, wherein said optical fiber comprises a polarization-maintaining optical fiber.

10. The apparatus according to claim 1, wherein said optical fiber is prepared by a process comprises:
fabricating the silica matrix by solution doping using dysprosium ions ($Dy^{3+}$), the dysprosium ions comprising a dysprosium ion concentration between $0.5 \times 10^{25}$ $m^{-3}$ and $10 \times 10^{25}$ $m^{-3}$.

11. An apparatus comprising:
an amplified spontaneous emission source comprising an optical fiber, said optical fiber comprising a solid core and a first end, said solid core comprising a silica matrix, said silica matrix comprising a rare-earth element and a glass co-dopant, said rare-earth element comprises neodymium, said glass co-dopant comprises $Al_2O_3$; and
a laser pump diode coupled to said first end of said optical fiber, said laser pump diode and said optical fiber cooperating to generate a spontaneous spectral emission confined to said solid core, the spontaneous spectral emission comprising a simultaneous plurality of spectral regions,
wherein the simultaneous plurality of spectral regions comprises at least two of an about 765 nm to 840 nm spectral region, an about 840 nm to 1000 nm spectral region and an about 1000 to 1160 nm spectral region.

12. The apparatus according to claim 11, wherein said rare-earth element comprises a neodymium concentration and said glass co-dopant comprises an $Al_2O_3$ concentration,
wherein a ratio of $Al_2O_3$ concentration to neodymium concentration is between 20:1 and 100:1.

13. The apparatus according to claim 12, wherein said glass co-dopant further comprises $P_2O_3$, said glass co-dopant comprising a $P_2O_3$ concentration,
wherein a ratio of $Al_2O_3$ concentration to $P_2O_3$ concentration is between 0 and 0.8.

14. The apparatus according to claim 11, wherein said laser pump diode comprises a center emission between 400 nm and 500 nm in wavelength and comprises a power between 5 mW and 500 mW.

15. The apparatus according to claim 14, wherein said optical fiber comprises a second end, the apparatus further comprising:
a fiber-coupled optical isolator connected to said second end of said optical fiber.

16. The apparatus according to claim 14, wherein said optical fiber comprises a second end, the apparatus further comprising:
a fiber-coupled filter connected to said second end of said optical fiber and passing a respective spectral region from the simultaneous plurality of spectral regions.

17. The apparatus according to claim 14, wherein said optical fiber comprises a second end, the apparatus further comprising:
a plurality of fiber-coupled filters connected to said second end of said optical fiber and passing a plurality of respective spectral regions from the simultaneous plurality of spectral regions; and
a fiber switch located between said optical fiber and said plurality of fiber-coupled filter,
wherein said fiber switch and said plurality of fiber-coupled filters cooperate to select for output from among the plurality of respective spectral regions.

18. The apparatus according to claim 11, further comprising:
an intensity modulator communicating with said laser pump diode thereby temporally modulating said laser pump diode.

19. The apparatus according to claim 11, wherein said optical fiber comprises a polarization-maintaining optical fiber.

20. The apparatus according to claim 11, wherein said optical fiber is prepared by a process comprises:
fabricating the silica matrix by solution doping using neodymium ions ($Nd^{3+}$), the neodymium ions comprising a neodymium ion concentration between $0.1 \times 10^{25}$ $m^{-3}$ and $10 \times 10^{25}$ $m^{-3}$.

* * * * *